United States Patent [19]

Kremer

[11] 3,714,184
[45] Jan. 30, 1973

[54] SUCCINIMIDE-CONTAINING DYESTUFFS

[75] Inventor: Gilbert Victor Henri Kremer, 95 Ermont, France

[73] Assignee: Ugine Kuhlmann, Paris, France

[22] Filed: Oct. 1, 1969

[21] Appl. No.: 862,921

[30] Foreign Application Priority Data

Oct. 10, 1968 France..............................68196358

[52] U.S. Cl..............260/326.3, 8/177, 260/247.2 A, 260/293.71, 260/310 R, 260/326.5 FM
[51] Int. Cl..............................................C07d 27/10
[58] Field of Search.....260/326.5 FM, 326.3, 310 R, 260/247.2 A, 293.71

[56] References Cited

UNITED STATES PATENTS 3,299,096   1/1967   Zienty et al. ......................260/326.3

Primary Examiner—Alex Mazel
Assistant Examiner—Joseph A. Narcavage
Attorney—Beveridge & Degrandi

[57] ABSTRACT

Dyestuffs of the formula:

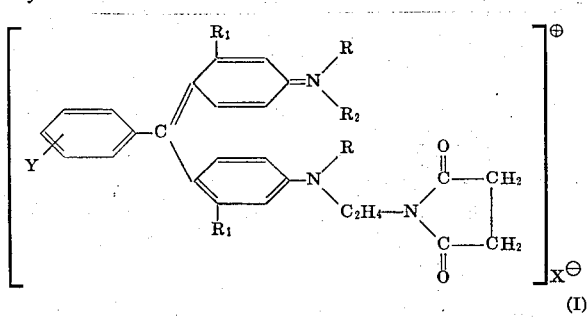

(I)

wherein R represents a hydrogen atom or an alkyl or alkyl-O-alkyl group, the alkyl groups containing one to four atoms of carbon, $R_1$ represents a hydrogen atom or a methyl group, $R_2$ represents a alkyl group containing one to four carbon atoms, or a cycloalkyl, aryl, aralkyl or succinimidoethyl group, Y represents a hydrogen or halogen atom or an alkoxy, nitro, cyano, or amino group, and X represents a monovalent anion and processes for their manufacture.

These dyestuffs are particularly suitable for the coloration of fibers based on polymers or copolymers of acrylonitrile.

9 Claims, No Drawings

SUCCINIMIDE-CONTAINING DYESTUFFS

The present invention relates to dyestuffs, their preparation and use.

According to the present invention dyestuffs are provided of the general formula:

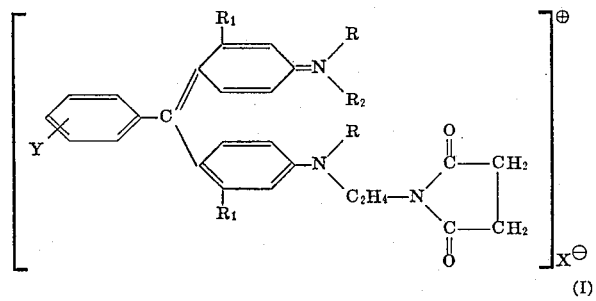

in which R represents a hydrogen atom or an alkyl or alkyl-O-alkyl group, the alkyl groups containing one to four carbon atoms, $R_1$ represents a hydrogen atom or a methyl group, $R_2$ represents an alkyl group containing one to four carbon atoms, or a cycloalkyl, aryl, aralkyl or succinimido-ethyl group, Y represents a hydrogen or halogen atom or an alkoxy (containing one to four carbon atoms), nitro, cyano, or amino group and X represents a monovalent anion.

Examples of cycloalkyl, aralkyl or aryl groups represented by $R_2$ are the cyclohexyl, benzyl and phenyl groups and phenyl groups substituted by non-water-solubilizing substituents, such as halogen atoms and alkyl and alkoxy groups containing one to four carbon atoms.

The amino group entering into the definition of Y may be a simple amino group or an amino group of the formula:

wherein $R_3$ is a hydrogen atom or an alkyl or an alkyl group, $R_4$ represents an alkyl, cycloalkyl (such as for example cyclohexyl) or aryl group or a heterocyclic residue, or $R_3$ and $R_4$ with the nitrogen atom form a heterocyclic radical, such as for example morpholino or piperidono. The aryl groups may be for example phenyl, diphenyl or naphthyl groups which may be substituted by at least one non-ionic substituent such as for example a halogen atom or an alkyl, alkoxy, acyl, acylamino, dialkylamino or alkyl (aryl) amino group, the alkyl and alkoxy groups having one to four carbon atoms.

The anion does not possess any tinctorial property; it is preferably selected from anions giving water-soluble salts of dyestuffs. For example, the chloride, bromide, sulphate, phosphate, acetate, formate, oxalate and chlorozincate anions may be mentioned.

The dyestuffs of formula (I) dye fibers based on polymers or copolymers of acrylonitrile in blue and green shades with good fastness and good stability to artificial light. Among these dyestuffs, those of the following formula are particularly advantageous on account of their affinity for the said fibers:

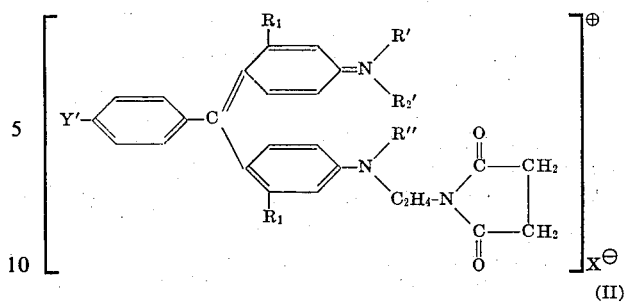

in which formula $R_1$ represents a hydrogen atom or a methyl group, $R'$ represents a hydrogen atom or an alkyl group containing one to four carbon atoms, $R''$ represents an alkyl residue containing one to four carbon atoms, $R'_2$ represents an alkyl group containing one to four carbon atoms, a cycloalkyl (for example cyclohexyl) or aralkyl (for example benzyl) group, or an aryl group, preferably a phenyl group, which may be substituted by non-water solubilizing substituents such as halogen atoms or the alkyl and alkoxy groups containing one to four carbon atoms, $Y'$ represents a hydrogen or halogen atom or an alkoxy(containing one to four carbon atoms), nitro, cyano or arylamino group, and X represents a monovalent anion.

The dyestuffs of formula I possessing two 2',5'-dioxopyrrolidinylethyl groups can be prepared, for example, by condensing a N-(β-succinimidoethyl)aniline of the general formula:

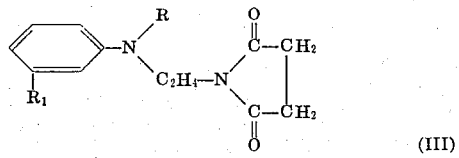

in which R and $R_1$ have the same significance as above, with a benzaldehyde, and oxidation of the leuco derivative thus obtained.

The dyestuffs of formula II may be obtained for example by condensing an aminobenzophenone of the general formula:

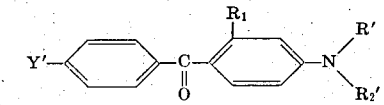

with an aromatic amine of the formula:

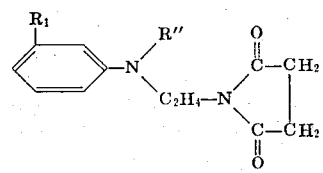

in which $Y'$, $R_1$, $R'$, $R'_2$, and $R''$ have the meanings given above in the presence of a condensing agent such as for example phosphorus oxychloride.

The dyestuffs of formula I in which Y represents a substituted amino group or forms part of a heterocyclic ring or of formula II in which $Y'$ represents an arylamino group may also be prepared by reacting a halogenated dyestuff of either the formula:

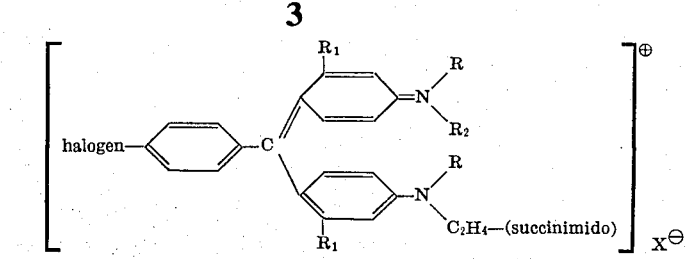

or the formula:

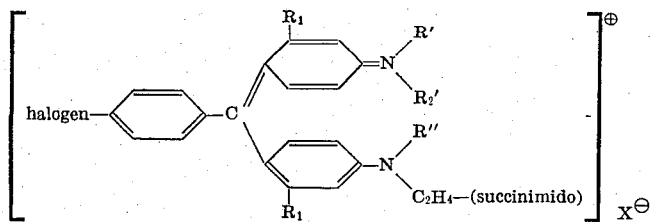

with a primary or secondary amine.

French Pat. No. 954,752 has mentioned the possibility of dyeing textile articles based on copolymers of vinyl chloride and acrylonitrile by dyestuffs of the triphenylmethane series. The colorations obtained with the known dyestuffs of this type, however, are lacking in fastness to light.

The invention is illustrated by, but not limited to, the following Examples in which the parts given are parts by weight unless the contrary is indicated.

EXAMPLE 1 a. Preparation of the leuco derivative 52 parts of N-ethyl-N-($\beta$-succinyliminoethyl)-m-toluidine, 50 parts of isopropyl alcohol, 3 parts of urea and 10.6 parts of benzaldehyde are introduced into an apparatus provided with a condenser, a rotary stirrer, a thermometer and a gauge. 8.3 parts by volume of concentrated sulphuric acid are gradually introduced without the temperature exceeding 50°C. The mixture is then heated at 85°C. for 10 hours while stirring. The cooled mixture is run into 1,000 parts of water and the liquor is neutralized with a caustic soda solution. The insoluble leuco derivative is isolated by filtration, washed on the filter with water and dried in a hot-air oven. Dry weight: 61 parts.

b. Oxidation of the leuco derivative

The leuco derivative obtained is dissolved in 150 parts of methyl alcohol, 20 parts of water and 40 parts by volume of concentrated hydrochloric acid. This solution is cooled to +5°C. and 60 parts of 50% lead dioxide are added in a period of 30 minutes, the temperature being maintained at between +5° and +10°C. and the mixture is stirred for a further hour at the same temperature. Then a solution of 30 parts of crystalline sodium sulphate in 200 parts of water is added. After stirring for 15 minutes, the insoluble lead sulphate is filtered off and washed on the filter with 1,300 parts of water. The dyestuff is precipitated in the filtrate in the form of the chlorozincate by the successive addition of 300 parts of sodium chloride, then 20 parts by volume of a 50 percent solution of zinc chloride. The product is stirred for an hour, then the dyestuff is isolated by filtration and washed on the filter with 500 parts of a 20 percent solution of sodium chloride. 87 parts by weight of the dyestuff, dried in a hot-air oven, are obtained. It dyes fibers based on polymers or copolymers of acrylonitrile in bright yellow-green shades which are very fast to light.

EXAMPLE 2

On replacing the benzaldehyde in Example 1 by an equivalent amount of 3-nitrobenzaldehyde, a yellow-green dyestuff of similar properties is obtained.

EXAMPLE 3

On replacing the benzaldehyde in Example 1 by an equivalent amount of 4-chlorobenzaldehyde, a dyestuff of the following formula is obtained:

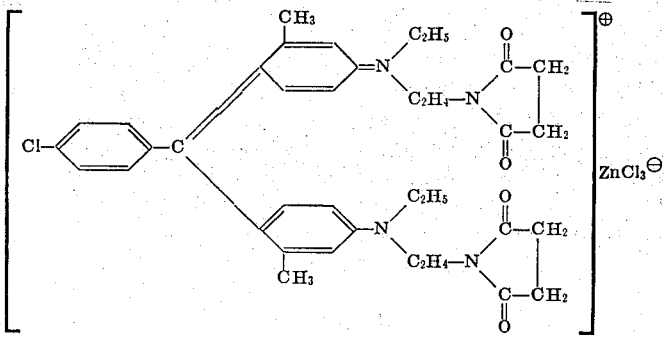

It dyes fibers based on polymers or copolymers of acrylonitrile a yellow-green shade which is very fast to light.

EXAMPLE 4

40 parts of the dyestuff of Example 3 are dissolved in 25 parts of water acidified with one part of concentrated hydrochloric acid. 14 parts of p-toluidine are added to this solution, then it is heated at 80°C. until the presence of the initial green dyestuff is no longer detected by paper chromatography. The mixture is then run into 3,000 parts of hot water acidified with 30 parts of acetic acid, and the solution is clarified by filtering while hot. To the cooled filtrate are added 100 parts of sodium chloride, and the precipitated dyestuff is isolated by filtration, washed on the filter with a 5 percent solution of sodium chloride and dried at 60°C. in a hot-air oven. It dyes fibers based on polymer or copolymers of acrylonitrile in very bright blue shades which are stable to artificial light and fast to light.

The following Table tabulates further Examples of analogous dyestuffs prepared as in Example 4, but by replacing the p-toluidine by the amines YH indicated in the second column.

| Example | Amine YH | Shade on polyacrylic fibers |
|---|---|---|
| 5 | p-anisidine | blue |
| 6 | aniline | blue |
| 7 | N-ethylaniline | blue |
| 8 | p-phenetidine | blue |
| 9 | p-toluidine | blue |
| 10 | m-chloraniline | red-blue |
| 11 | morpholine | green-blue |
| 12 | a-naphthylamine | blue |
| 13 | 4-acetylamino-aniline | green-blue |
| 14 | 4-amino-diphenyl | blue |
| 15 | 3,5-dimethyl-4-amino-pyrazole | blue-violet |

EXAMPLE 16

On replacing the 52 parts of N-ethyl-N-($\beta$-succinyliminoethyl)-m-toluidine in Example 1 by 56 parts of N-($\beta$-methoxyethyl)-N-($\beta$-succinyliminoethyl)-m-toluidine and the 10.6 parts of benzaldehyde by 14.1 parts of p-chlorobenzaldehyde, and following the method of operation described in Example 1, a dyestuff of the following formula is obtained.

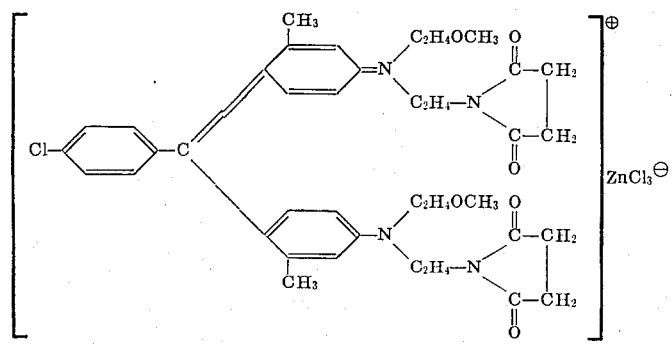

It dyes fibers based on polymers or copolymers of acrylonitrile a yellow-green shade which is very fast to light.

EXAMPLE 17

On reacting 41 parts of the dyestuff of Example 16 with 14 parts of p-toluidine under the conditions described in Example 4, a dyestuff is obtained which dyes fibers based on polymers or copolymers of acrylonitrile a bright blue shade, which is fast to light.

EXAMPLE 18

On replacing the p-toluidine in Example 17 by an equivalent amount of p-anisidine, a dyestuff of the same tinctorial properties is obtained.

EXAMPLE 19

45 parts of 4-dimethylamino-benzophenone are mixed with 52 parts of N-ethyl-N-(2-succinimidoethyl)-m-toluidine and 50 parts of phosphorus oxychloride, then the whole is heated at 100°C. for several hours. 1000 parts of hot water are added to the still hot mixture, the solution obtained is allowed to cool and 100 parts of sodium chloride and 150 parts by volume of a 50 percent solution of zinc chloride are added. The dyestuff separates in a gummy form, and is isolated and redissolved in 2,000 parts of boiling water acidified with 50 parts of glacial acetic acid. The liquid obtained is clarified by filtering hot. The dyestuff is precipitated from the filtrate by the addition of 50 parts by volume of a 50 percent solution of zinc chloride, then isolated by filtration, and is finally washed on the filter with a 20 percent solution of sodium chloride and dried. It has the following formula:

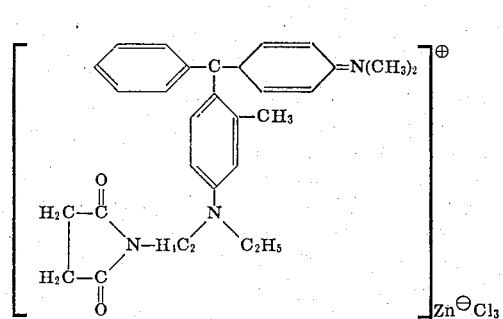

It dyes fibers based on polymers or copolymers of acrylonitrile a yellow-green shade having good general fastness, especially to light.

The following Table summarizes some Examples analogous to the Example 19, the dyestuffs being prepared by using other benzophenones.

| Example | Benzophenone | Shade of the dyestuff on acrylic fibers |
|---|---|---|
| 20 | 4-diethylamino-benzophenone | yellow green |
| 21 | 4-diethylamino-2-methyl-benzophenone | yellow green |
| 22 | 4-dimethylamino-4'-chloro-benzophenone | bright green |
| 23 | 4-diethylamino-2-methyl-4'-chloro-benzophenone | bright yellow green |

EXAMPLE 24

A mixture of 22 parts of the dyestuff of Example 22, 15 parts of p-anisidine, 60 parts of water and 0.5 parts of concentrated hydrochloric acid is heated for 5 hours at 85°C.

The reaction mixture is then poured into 1,000 parts of hot water acidified with 50 parts of acetic acid, and 100 parts of sodium chloride are added. The dyestuff is precipitated and is isolated by filtering in the cold, and is washed on the filter with a 3 percent solution of sodium chloride and dried at 60°C. It dyes acrylic fibers a bright blue shade which is fast to light.

Examples similar to Example 24 are grouped in the following Table, the dyestuffs being prepared by replacing the p-anisidine by another aromatic amine.

| Example | Amine used | Shade of the dyestuff on acrylic fibers |
|---|---|---|
| 25 | paratoluidine | bright blue |
| 26 | aniline | blue |

I claim:

1. A dyestuff of the formula:

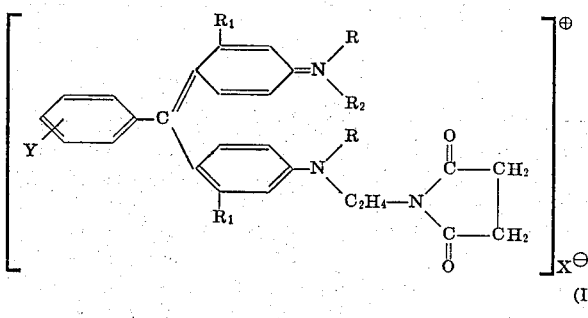

(I)

wherein R represents hydrogen or an alkyl or alkyl-O-alkyl group, the alkyl groups containing one to four carbon atoms, $R_1$ represents hydrogen or methyl, $R_2$ represents an alkyl group containing one to four carbon atoms, cyclohexyl, benzyl, succinimidoethyl, phenyl, or phenyl mono-substituted by halogen or alkyl or alkoxy containing one to four carbon atoms, Y represents hydrogen, chlorine, alkoxy containing one to four carbon atoms, nitro, cyano, $NH_2$, 3,5-dimethyl-4-pyrazolylamino, piperidino, morpholino, or the group $—NR_3R_4$ wherein $R_3$ represents hydrogen or alkyl containing one to four carbon atoms and $R_4$ is alkyl containing one to four carbon atoms, cyclohexyl, phenyl, diphenyl, naphthyl, or phenyl, mono-substituted by halogen, alkyl containing one to four carbon atoms, alkoxy containing one to four carbon atoms or acetylamino, and X represents a water-soluble non-coloring monovalent anion.

2. A dyestuff according to claim 1 corresponding to the formula:

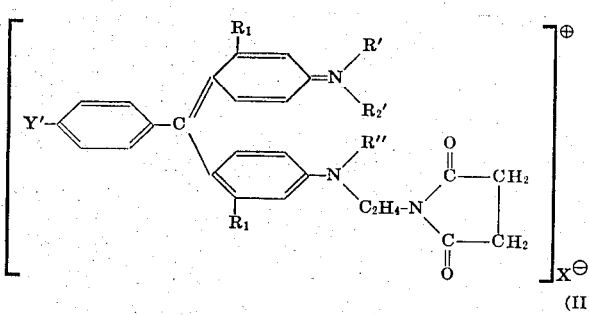

(II)

wherein $R_1$ represents a hydrogen atom or a methyl group R' represents a hydrogen atom or an alkyl group containing one to four carbon atoms, R'' represents an alkyl residue containing one to four carbon atoms, $R'_2$ represents an alkyl group containing one to four carbon atoms, cyclohexyl, benzyl, phenyl or phenyl mono-substituted by halogen or alkyl or alkoxy containing one to four carbon atoms, Y' represents hydrogen, halogen, alkoxy containing one to four carbon atoms, nitro, cyamo, phenylamino, or phenylamino mono-substituted by halogen or alkyl or alkoxy containing one to four carbon atoms and X represents a water-soluble non-coloring monovalent anion.

3. A dyestuff on the formula:

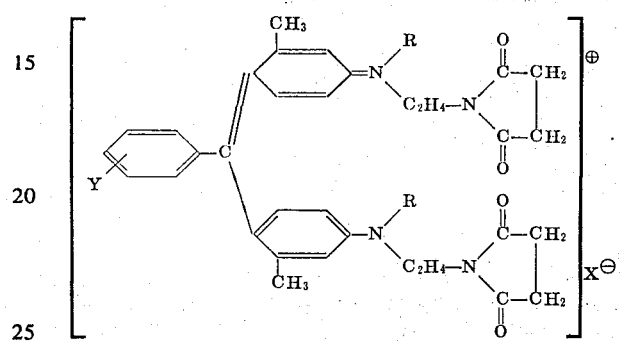

in which R represents hydrogen, alkyl containing one to four carbon atoms, or alkyl containing one to four carbon atoms substituted by alkoxy containing one to four carbon atoms, Y represents hydrogen, chlorine, nitro, alkoxy containing one to four carbon atoms, amino, 3,5-dimethyl-4-pyrazolylamino, piperidino, morpholino, or the group $—NR_3R_4$ wherein $R_3$ represents hydrogen or alkyl containing one to four carbon atoms and $R_4$ represents alkyl containing one to four carbon atoms, cyclohexyl, phenyl, diphenyl, naphthyl, or phenyl, mono-substituted by halogen, alkyl containing one to four carbon atoms, alkoxy containing one to four carbon atoms or acetylamino, and X represents a water-soluble non-coloring monovalent anion.

4. A dyestuff of the formula:

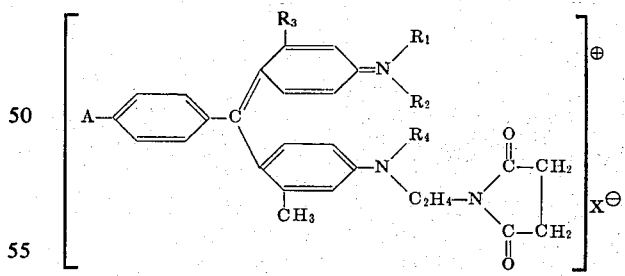

in which $R_1$ is hydrogen or alkyl containing one to four carbon atoms, $R_2$ is alkyl containing one to four carbon atoms, cyclohexyl, benzyl, phenyl, or phenyl monosubstituted by halogen or alkyl or alkoxy containing one to four carbon atoms, $R_3$ is hydrogen or methyl, $R_4$ is alkyl containing one to four carbon atoms, A is hydrogen, halogen, alkoxy containing one to four carbon atoms, nitro, cyano, phenylamino, or phenylamino monosubstituted by halogen or alkyl or alkoxy containing one to four carbon atoms, and X is a water-soluble non-coloring monovalent anion.

5. The dyestuff of the formula:

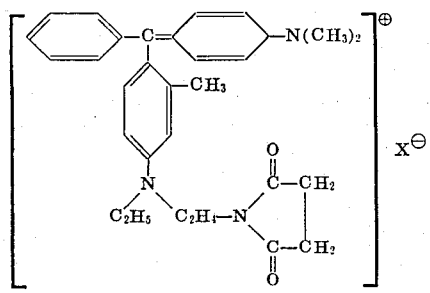

in which X is the chlorozincate anion.

6. The dyestuff of the formula:

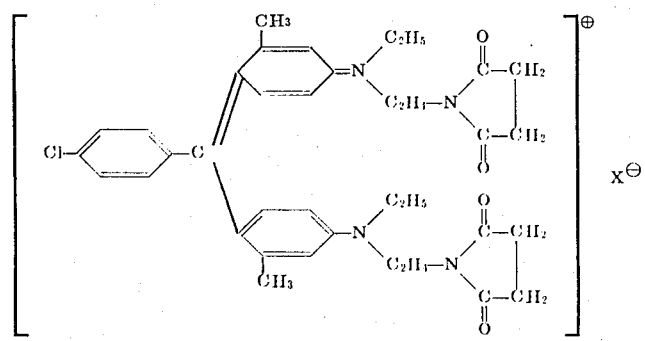

in which Xθ is the chloride anion.

wherein Xθ is the chlorozincate anion.

7. The dyestuff of the formula:

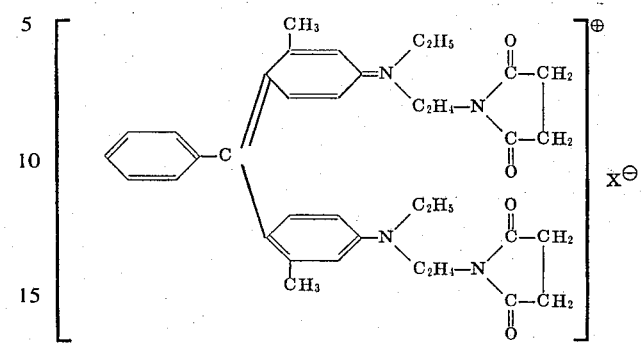

in which Xθ is the chlorozincate anion.

8. The dyestuff of the formula:

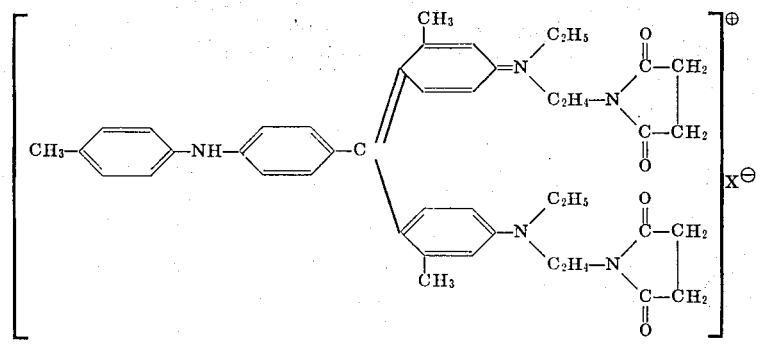

in which Xθ is the chloride anion.

9. The dyestuff of the formula:

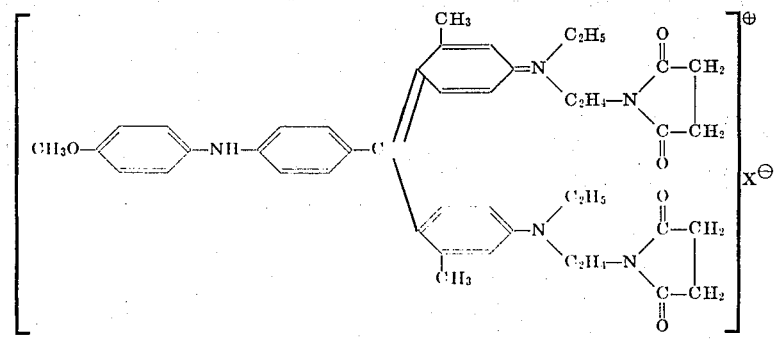

in which Xθ is the chloride anion.

* * * * *